United States Patent [19]
Trueb et al.

[11] Patent Number: 5,259,410
[45] Date of Patent: * Nov. 9, 1993

[54] SYSTEM FOR P-TRAP PROTECTION

[75] Inventors: Steven R. Trueb, Vernon; Thomas W. Trueb, Ellington, both of Conn.

[73] Assignee: Truebro Inc., Ellington, Conn.

[*] Notice: The portion of the term of this patent subsequent to Oct. 8, 2008 has been disclaimed.

[21] Appl. No.: 944,836

[22] Filed: Sep. 14, 1992

Related U.S. Application Data

[63] Continuation-in-part of Ser. No. 754,048, Sep. 3, 1991, Pat. No. 5,163,469, which is a continuation-in-part of Ser. No. 569,995, Aug. 20, 1990, Pat. No. 5,054,513.

[51] Int. Cl.[5] .............................. F16L 7/00; F16L 9/22
[52] U.S. Cl. .............................. 137/375; 137/247.51; 137/797; 285/47; 138/155; 138/158
[58] Field of Search ............... 138/155, 158, DIG. 11, 138/157; 137/247.49, 247.51, 797, 375; 285/47

[56] References Cited

U.S. PATENT DOCUMENTS

| | | | |
|---|---|---|---|
| 2,037,625 | 4/1936 | Goepel et al. | 285/122 |
| 2,650,180 | 8/1953 | Walker | 154/44 |
| 2,761,949 | 9/1956 | Cotton | 219/38 |
| 2,937,662 | 5/1960 | Green | 138/25 |
| 3,153,546 | 10/1964 | Dunn | 285/13 |
| 3,177,528 | 4/1965 | Flower et al. | 18/36 |
| 3,402,731 | 9/1968 | Martin | 137/375 |
| 3,559,694 | 2/1971 | Volberg | 138/147 |
| 3,598,157 | 8/1971 | Farr | 138/158 |
| 3,719,209 | 3/1973 | Rush et al. | 138/177 |
| 3,960,181 | 6/1976 | Baur et al. | 138/178 |
| 4,205,105 | 5/1980 | Blundell | 428/36 |
| 4,240,462 | 12/1980 | Bankstahl | 137/377 |
| 4,441,743 | 4/1984 | Steenbergen | 285/21 |
| 4,463,780 | 8/1984 | Schultz et al. | 138/178 |
| 4,669,509 | 6/1987 | Botsolas | 138/178 |
| 4,713,271 | 12/1987 | Searl et al. | 428/36 |
| 4,840,201 | 6/1989 | Botsolas | 138/178 |

FOREIGN PATENT DOCUMENTS 1249974 2/1989 Canada .

*Primary Examiner*—A. Michael Chambers
*Attorney, Agent, or Firm*—Ira S. Dorman

[57] ABSTRACT

Slit pieces of thermal insulating molded rubber are configured to conform to under-sink piping, so as to provide protection against burn injury from contact with hot surfaces. Three or four pieces are telescopically and rotatably interengaged with one another to cooperatively enclose an installed P-trap assembly, and the piece covering the J-bend is formed with a protrusion to accommodate clean-out structure provided thereon.

14 Claims, 3 Drawing Sheets

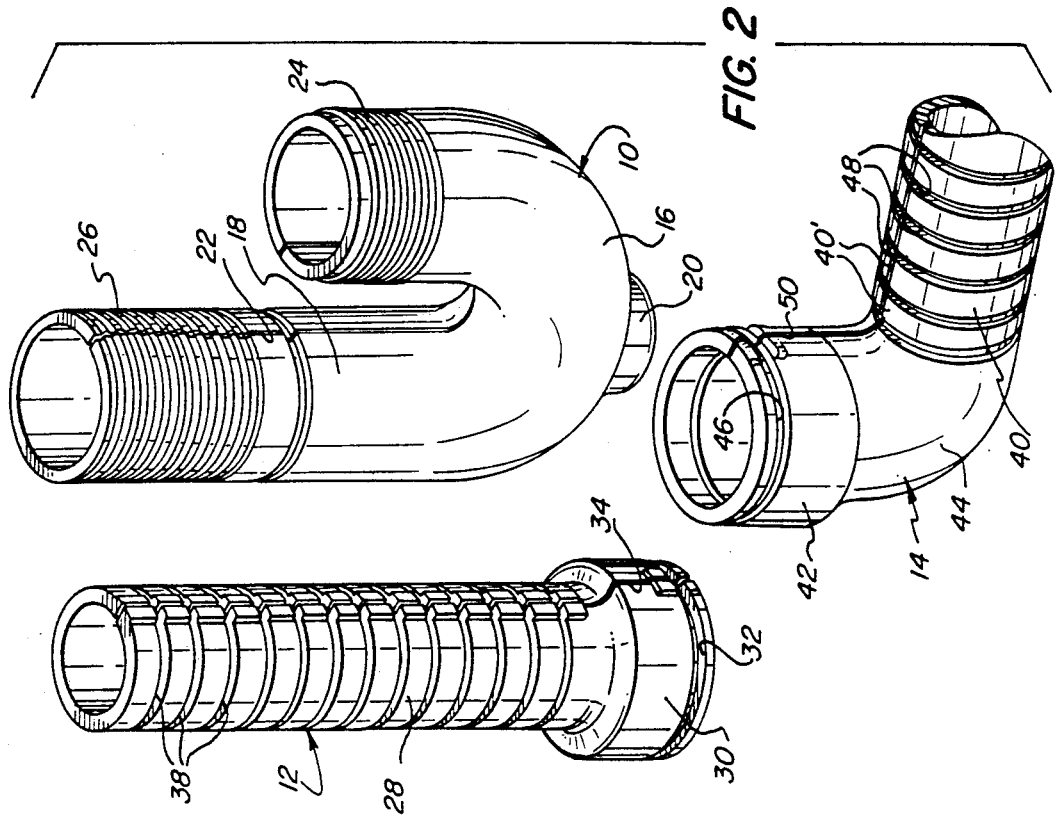
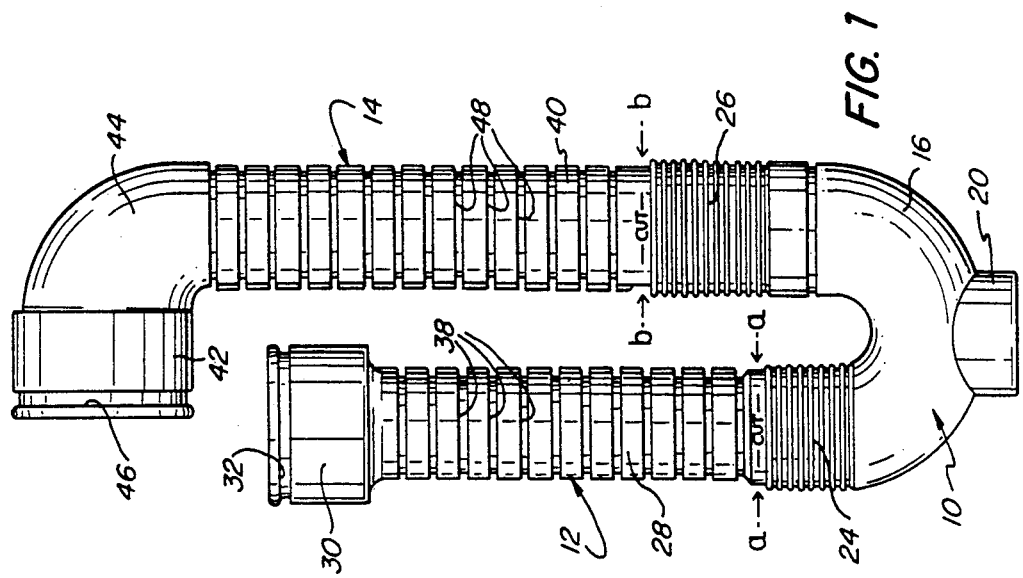

SYSTEM FOR P-TRAP PROTECTION

CROSS-REFERENCE TO RELATED APPLICATIONS

This application is a continuation-in-part of copending application for Letters patent Ser. No. 07/754,048, filed Sep. 3, 1991 and now issued as U.S. Pat. No. 5,163,469, which in turn was a continuation-in-part of application for Letters patent Ser. No. 07/569,995, filed Aug. 20, 1990 and now issued as U.S. Pat. No. 5,054,513.

BACKGROUND OF THE INVENTION

Regulations in place in many municipalities require that the so-called "P-trap" under-sink piping be insulated so as to prevent injury from contact with hot metal surfaces. Wheelchair bound individuals are at particular risk.

The required thermal insulation may be supplied by wrapping or otherwise applying lengths of insulation (such as of foam rubber and the like) about the pipes and fixtures. Such practices are however undesirable for a number of reasons: application is often difficult and time-consuming; the applied insulating material tends to become disoriented and displaced; the finished installation is typically unaesthetic; and often the result is simply ineffectual.

The prior art suggest a wide variety of pipe covering techniques and structures. For example, Far et al U.S. Pat. No. 3,598,157 discloses preformed covering pieces made of foamed plastics and configured for various pipe fittings. Blundell U.S. Pat. No. 4,205,105 shows an elongated pipe-insulating structure that is axially slit along one side, and Martin U.S. Pat. No. 3,402,731 provides foamed insulating sleeves for pipe elements.

U.S. Pat. Nos. 2,650,180, 2,937,662, 3,153,546, 3,559,694, 4,441,743 and 4,840,201, to Walker, Green, Dunn, Volberg, Steenbergen and Botsolas, respectively, all show encased insulating structures applied to pipes and fittings; U.S. Pat. Nos. 3,960,181, 4,463,780 and 4,669,509, to Baur et al, Schultz et al and Botsolas, respectively, provide one-piece covering wrappings fabricated from flexible plastic materials; and U.S. Pat. Nos. 3,177,528 and 3,719,209, to Flower et al and Rush et al, respectively, are directed to electrically insulated coatings for pipe fittings and to extruded plastic plumbing traps.

Despite the activity in the art indicated by the foregoing, a need remains for means by which under-sink piping can quickly, easily, and inexpensively be thermally insulated. It is accordingly a broad object of the present invention to provide such means; a related object is to provide a piping installation that is insulated thereby.

More specific objects of the invention are to provide a thermal insulation system that is adapted for ready installation upon under-sink piping, so as to provide highly effective protection against burn injury from hot metal surfaces; to provide such a system which also provides protection against cuts and abrasions; and to provide such a system which is, in addition, of relatively simple and inexpensive construction, quick and easy to apply, and neat, stable, and aesthetically pleasing when in place.

SUMMARY OF THE INVENTION

It has now been found that certain of the foregoing and related objects of the invention are attained by the provision of a thermal insulation system comprising a first, substantially J-shaped tubular piece, a second, substantially straight tubular piece, and a third, substantially L-shaped tubular piece, the pieces being fabricated from a resiliently yieldable material having thermal insulating properties, and being slit along their lengths to permit spreading of marginal portions for facile installation, emplaced over a corresponding part of an installed P-trap piping assembly. The end portions of the first piece are of circular external cross-sectional configuration, and one of the end portions of both the second piece and the third piece constitute collar portions with inwardly extending circular recesses; the recesses are dimensioned to telescopically and rotatably seat one of the end portions of the first piece therewithin.

The J-shaped piece will preferably include a toric section having a protrusion formed in a centralized location on a radially outer wall portion thereof, for enclosing cleanout access port structure on the J-shaped piping component of the installation. Certain embodiments of the system will include a fourth, substantially L-shaped tubular piece. In those instances one of the end portions of the second piece, the third piece, and the fourth piece will constitute collar portions with inwardly extending recesses of circular cross-sectional configuration, as described. The opposite end portion of the second piece will be of circular external cross-sectional configuration, and the recess in the collar portion of the fourth piece will be dimensioned to telescopically and rotatably seat that end portion therewithin.

Other objects of the invention are attained by the provision of a thermally insulated P-trap sink installation, comprising the insulation system herein described installed upon a tubular piping assembly. The piping assembly will include a substantially straight sink tailpiece member, a substantially J-shaped J-bend, a substantially L-shaped waste arm, and nut structure joining the tailpiece member and waste arm in end-to-end relationship to the opposite ends of the J-bend.

The toric section of the J-bend will normally have outwardly projecting clean-out structure formed in a centralized location through a radially outer wall portion thereof. In those instances, the first piece of the insulation system will preferably include a toric section having a protrusion formed in a centralized location, on a radially outer wall portion thereof, within which the clean-out structure is enclosed. Usually, the slit and the protrusion will be formed on opposite sides (e.g., on the top and bottom, respectively) of the first piece.

BRIEF DESCRIPTION OF THE DRAWINGS

FIG. 1 is an elevational view of an article comprising a system embodying the present invention;

FIG. 2 is an exploded perspective view of the article of FIG. 1, cut into three pieces to constitute the novel system;

DETAILED DESCRIPTION OF THE ILLUSTRATED EMBODIMENTS

Figure 3:
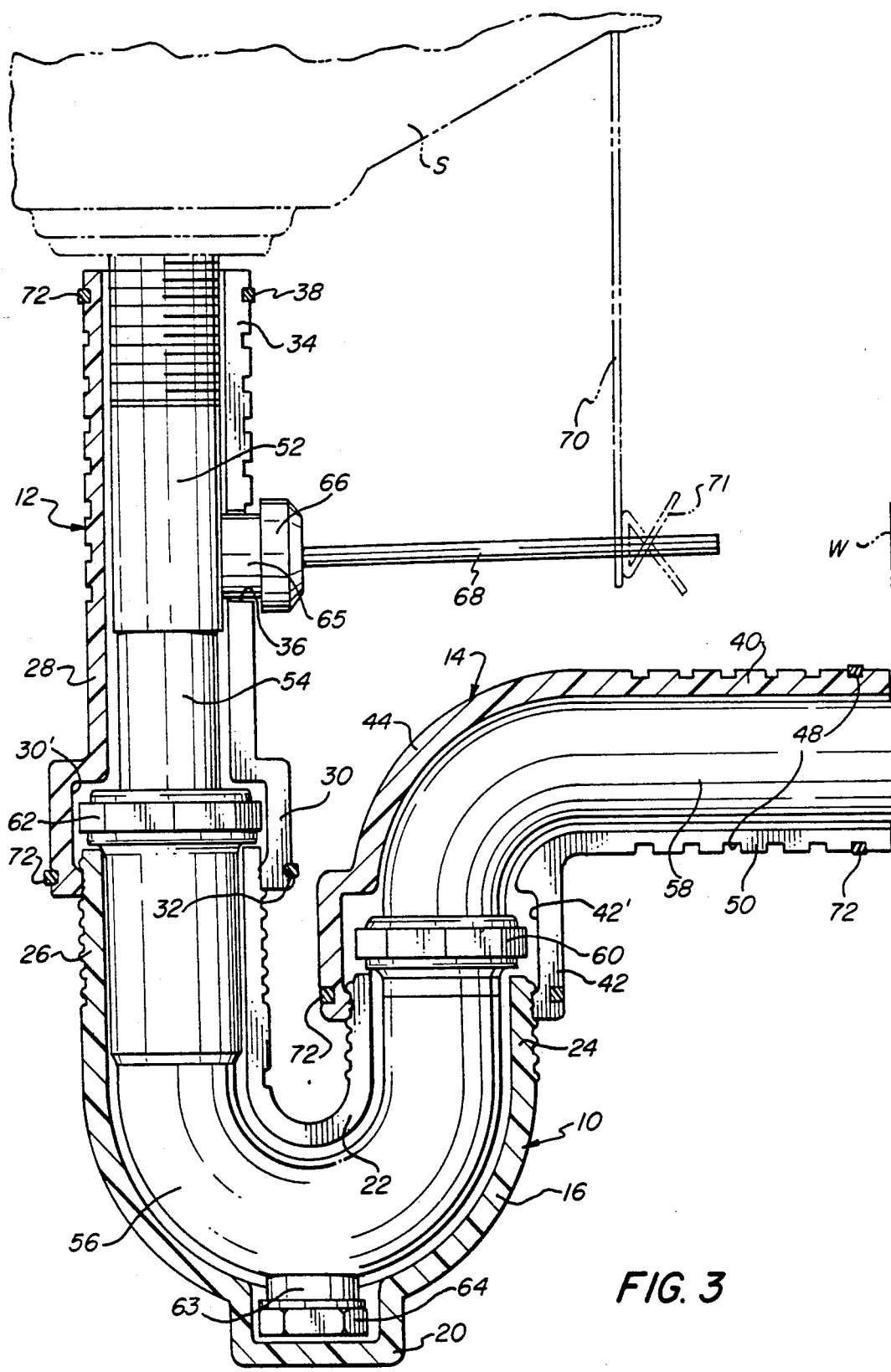
FIG. 3 is a sectional view showing the pieces of which the system is comprised, installed upon P-trap under-sink plumbing.

FIG. 1 of the drawings illustrates a unitary article, fabricated from a resiliently yieldable, rubbery, thermally insulating material. The article consists of a substantially J-shaped tubular section, a substantially straight tubular section, and a substantially L-shaped tubular section, generally designated respectively by the numerals 10, 12 and 14. In FIG. 2, the same sections are shown as separate pieces, having been produced therefrom by severance along the lines a—a and b—b, bearing "—CUT—" indicia. It will be noted that all pieces are of circular cross section, taken in planes transverse to the axes of their passages.

The J-shaped section, or piece 10, includes a toric portion 16, a relatively long straight portion 18, and a parallel, relatively short straight portion; the piece 10 is slit at 22, along its entire length. The toric portion 16 has a clean-out aperture-forming element 20 projecting from a radially outer wall portion thereof, in a medial plane and in an arcuately centralized location.

The straight piece 12 consists of an elongate cylindrical portion 28 and a short circular collar portion 30 at one end; slit 34 extends longitudinally therealong. A circumferential groove 32 surrounds the collar portion 30 adjacent its open end, and a series of similar grooves 38 are provided at equidistantly spaced locations on the cylindrical portion 28.

L-shaped piece 14 consists of a straight portion 40 and a circular collar portion 42, with a 90° arcuate portion 44 therebetween. The collar portion 42 has a circumferential groove 46 extending thereabout adjacent its open end, and a series of like grooves 48 surround the straight portion 40 at equidistantly spaced locations. The piece 14 is longitudinally slit at 50, thereby defining relatively displaceable marginal portions 40' along the length thereof. It will be appreciated that the slits 22, 34, 50 are elements of a continuous slit made in the unitary article, and that like displaceable portions are also defined on the pieces 10 and 12.

With particular reference now to FIG. 3, the drain plumbing for a sink "S" (shown in phantom line) is depicted, and includes a tailpiece member consisting of two, telescopically interengaged parts 52, 54, a J-bend 56, and a waste arm 58 extending from wall "W." The plumbing components have standard flanged and threaded end portions (not shown), which enable them to be joined by the nuts 60, 62 in end-to-end relationship. A clean-out access port is formed through the outer wall of the toric section of the J-bend 56, and is surrounded by a short neck portion 63, normally closed by the "nut" or cap 64; it will be appreciated that the nut 64 has sharp edges on its hexagonal, wrench-engaging outer portion.

The upper part 52 of the tailpiece assembly is threadably engaged with the bottom of the sink S, and is formed with an access port surrounded by a short neck portion 65, partially closed by an annular cap 66, through which extends the operating ar 68 for a "popup" drain plug mechanism (not illustrated). In conventional manner, the linkage 70 connects the arm 68 to an operating handle, and is secured on the arm 68 by a spring clip 71: the neck portion 65 is accommodated by cutting a hole 36 of appropriate diameter through the portion 28 of the straight piece 12, which would usually be done at the time of installation.

The J-shaped piece 10 of the insulation system is installed over the J-bend 56 of the piping assembly with the neck portion 63 and nut 64 of the clean-out structure extending into the element 20. Emplacement is of course achieved simply by spreading the marginal portions along the slit 22, which portions thereafter resume their original shape due to the inherent resiliency, or elastic memory, of the material from which the piece is fabricated. Although not shown, it will be appreciated that access to the nut 64 is afforded simply by cutting away the protruding element 20, and that until such access is required that element will afford protection against cuts and abrasions, which might otherwise be caused by contact with the sharp edges of the nut 64.

The nut 60 and associated parts, as well as the corrugated end portion 24 of the J-piece 10, are accommodated within the recess 42' defined by collar portion 42 on the L-shaped piece 14, the latter being applied to the waste arm 58 in the manner previously described. Plastic bands 72, seated within the circumferential grooves 46 and 48 at the opposite ends of the piece 14, secure it to the piece 10 and to the F-trap components 56, 58; it will be appreciated that the bands 72 will conveniently incorporate an automatic locking ratchet mechanism (not shown), the structure of which is conventional.

The straight tubular piece 12 is similarly applied to encase the tailpiece assembly 52, 54; the nut 62 and associated parts, together with the corrugated opposite end portion 26 of the J-shaped piece 10, are seated within the enlarged recess 30' formed by the collar portion 30 thereof. The straight piece 12 is secured to the J-shaped piece 10 and the drain components 52, 56 by use of banding elements 72 received in the circumferential grooves 32 and 38, with the plug-mounting structure 65, 66 protruding laterally through the hole 36 therein.

It will be appreciated that the length of each component, comprising the P-trap piping assembly that is to be insulated, may differ from installation-to-installation, as may the relative angular orientations of the several parts; i.e., the waste arm and the tailpiece (and more particularly, the plug-mounting structure of the latter) of existing plumbing will frequently be rotated out of the plane in which the J-bend lies. Providing overlapping collar portions on the pieces that are designed to cover the tailpiece and the waste arm will enable ready accommodation of length variations by shortening of the overlapped portions; and the circular cross-sectional configurations of all of the mating end portions will permit relative rotation of the pieces for orientation in any desired angular interrelationship.

Figure 5:
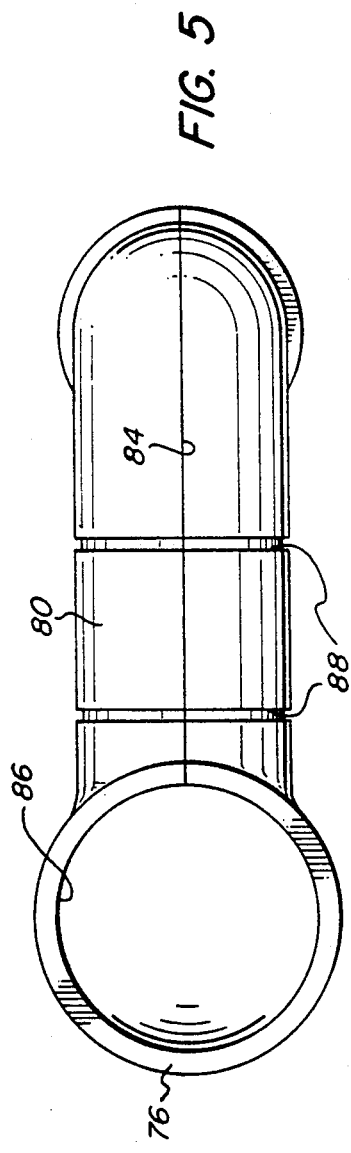
FIGS. 5 and 6 are top and end views, respectively, of the fourth piece illustrated in FIG. 4.
Figure 6:
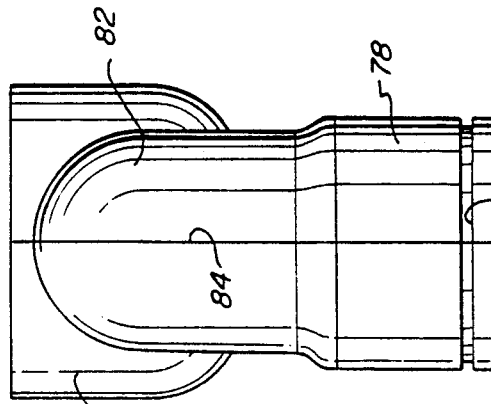
Figure 4:
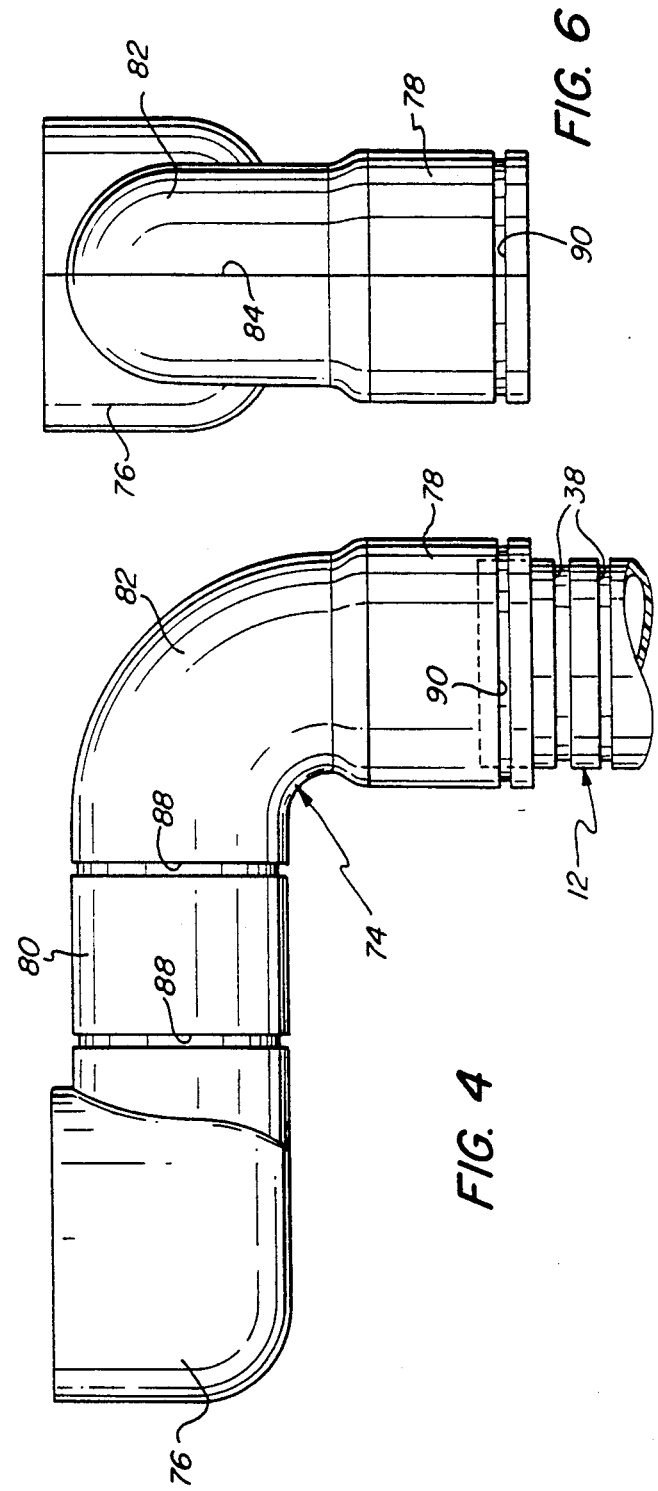
FIG. 4 is an elevational view of a fourth piece of which the system may be comprised, assembled with another piece thereof.

The insulating piece shown in FIGS. 4 through 6, and generally designated by the numeral 74, differs from those of the preceding Figures only in the nature of the plumbing component that it is intended to insulate, and consequently in its form. The piece 74 is configured for application to a so-called "offset wheelchair strainer," a standard piping section used in lavatory installations that are designed to facilitate wheelchair access. Such offset strainers are installed directly under the sink, and are of generally L-shaped configuration; they include a section (typically about 5 inches long) that is horizontal in the normal installation, a downwardly directed vertical section (typically 7 to 8 inches long), and a connecting elbow section therebetween (the vertical section takes the place of the upper tailpiece part 52 shown in FIG. 3).

The insulating piece 74 covers the horizontal and elbow sections of the offset strainer. A circular recess 86 extends into the enlarged end portion 76, to accommodate a drain-connecting head portion of the strainer, a collar portion 78 at the other end provides an oppositely directed circular recess (not visible), and straight and elbow portions, 80, 82 respectively, are defined therebetween. The recess in the collar portion 78 is dimensioned to telescopically and rotatably seat the upper end portion of the straight piece 12, which covers the vertical section of the offset strainer and the lower tailpiece part 54 telescopically assembled therewith, and circumferential grooves 88, 90 and a lengthwise slit 84 are provided for the purposes described hereinabove.

Although the drawings and the corresponding portions of the specification describe the best mode contemplated for carrying out the invention, it will be understood that variations can be made without departing from the novel concepts hereof. Thus, changes may be made in the shapes, features and relationships in and among the several insulating pieces, to best accommodate peculiarities of particular installations or styles of piping. The circumferential grooves and cooperating plastic bands shown in the drawings provide highly effective means for securing the parts in assembly, but suitable alternatives may occur to those skilled in the art and may be employed. It might be mentioned that the series of grooves 38 and 48 on the straight and L-shaped pieces 12, 14, respectively, serve not only to receive the bands 72 in a very neat and functionally desirable manner, but also to designate locations for cutting; as a practical matter, these sections may be molded in lengths that will normally be excessive, intending that they be cut to size at the time of installation.

As has been pointed out, the preferred material for fabrication of the insulating pieces will usually be a synthetic elastomeric material, such as a polyurethane, a polyvinyl chloride, or a silicon rubber, so as to provide the desired resiliency for facile installation; the material may or may not be of a foamed structure, and may of course be of any desired coloration. In most cases the article will be produced by molding using any technique that is appropriate under the circumstances, as will be apparent to those skilled in the art.

It might also be mentioned that the insulating pieces will typically have a nominal wall thickness ranging from ⅛ inch to ½ inch, with ¼ inch often providing a most desirable balance of functional properties and cost factors. Finally, it will be appreciated that the system described can be used to insulate piping of plastic as well as of metal, and that the components will normally afford protection against impact injury as well as against burns and scrapes.

Thus, it can be seen that the present invention provides a system by which under-sink piping can quickly, easily, and inexpensively be insulated. The system is adapted for ready installation upon under-sink piping, so as to afford highly effective protection against burn injury from hot metal surfaces, as well as effective protection against cuts and abrasions; it is, in addition, of relatively simple and inexpensive construction, quick and easy to apply, and neat, stable, and aesthetically pleasing when in place.

Having thus described the invention, what is claimed is:

1. A thermal insulation system for the P-trap piping assembly of a sink or the like, comprising a first, substantially J-shaped tubular piece, a second, substantially straight tubular piece, and a third, substantially L-shaped tubular piece, each of said pieces having opposite end portions, each being of unitary construction and fabricated from a resiliently yieldable material having thermal insulating properties, and each being longitudinally slit to permit spreading of the marginal portions extending along said slit for facile installation, said end portions of said first piece being of circular external cross-sectional configuration, and one of said end portions of both said second piece and said third piece constituting a collar portion having an inwardly extending recess of circular cross-sectional configuration, said recesses being dimensioned to telescopically and rotatably seat one of said end portions of said first piece, overlapped by the corresponding one of said collar portions.

2. The system of claim 1 wherein each of said collar portions has a circumferential groove thereabout for the receipt of a clamping band.

3. The system of claim 1 wherein the distal end portion of at least one of said second and third pieces, remote from said location of overlap thereof, has a plurality of circumferential grooves extending thereabout at longitudinally spaced locations therealong.

4. The system of claim 1 wherein said material is of rubbery character.

5. The system of claim 4 wherein said material has a foamed structure.

6. The system of claim 1 wherein said first piece includes a toric section having a protrusion formed in a centralized location on a radially outer wall portion thereof, for enclosing clean-out access port structure provided in the J-shaped piping component of a P-trap sink installation.

7. A thermally insulated P-trap installation for a sink or the like, comprising:
a tubular piping assembly including a substantially straight sink tailpiece member, a substantially J-shaped J-bend, a substantially L-shaped waste arm, and nut structure joining said tailpiece member and waste arm in end-to-end relationship to the opposite ends of said J-bend: and
a thermal insulation system comprising a first, substantially J-shaped tubular piece, a second, substantially straight tubular piece, and a third, substantially L-shaped tubular piece, each of said pieces having opposite end portions, and being of unitary construction and fabricated from a resiliently yieldable material having thermal insulating properties, and each being longitudinally slit to permit spreading of the marginal portions extending along said slit so as to enable facile installation of said first, second and third pieces, respectively, over said J-bend, tailpiece member, and waste arm of said piping assembly, said pieces being so installed with one of said end portions of said second and third pieces disposed in overlapped relationship with each of said end portions of said first piece, said end portions of said first piece being of circular external cross-sectional configuration, and said one end portions of both said second piece and said third piece constituting a collar portion having an inwardly extending recess of circular cross-sectional configuration, said recesses being dimensioned to telescopically and rotatably seat one of said end portions of said first piece, overlapped by the corresponding one of said collar portions.

8. The installation of claim 7 additionally including a banding element surrounding said end portions at each of the locations of overlap to secure said pieces in assembly with the components of said piping assembly, and wherein said material from which said pieces are fabricated is of rubbery character and has a foamed structure.

9. The installation of claim 7 wherein said J-bend of said piping assembly includes a toric section and two substantially straight sections extending in the same direction from said toric section, one of said straight sections being longer than the other and being joined to said substantially straight tubular piece, the other of said straight sections being joined to said substantially L-shaped tubular piece.

10. The installation of claim 9 wherein said toric section of said J-bend has outwardly projecting clean-out structure formed in a centralized location through a radially outer wall portion thereof, and wherein said first piece of said insulation system includes a toric section having a protrusion formed in a centralized location on a radially outer wall portion thereof, enclosing said clean-out structure.

11. A thermal insulation system for the P-trap piping assembly of a sink or the like, comprising a first, substantially J-shaped tubular piece, a second, substantially straight tubular piece, and a third, substantially L-shaped tubular piece, each of said pieces having opposite end portions, each being of unitary construction and fabricated from a resiliently yieldable material having thermal insulating properties, and each being longitudinally slit to permit spreading of the marginal portions extending along said slit for facile installation, said first piece including a toric section having a protrusion formed in a centralized location on a radially outer wall portion thereof, for enclosing clean-out access port structure provided in the J-shaped piping component of a P-trap sink installation.

12. The system of claim 11 wherein said slit and said protrusion are on opposite sides of said first piece.

13. A thermal insulation system for the P-trap piping assembly of a sink or the like, comprising a first, substantially J-shaped tubular piece, a second, substantially straight tubular piece, and third and fourth, substantially L-shaped tubular pieces, each of said pieces having opposite end portions, each being of unitary construction and fabricated from a resiliently yieldable material having thermal insulating properties, and each being longitudinally slit to permit spreading of the marginal portions extending along said slit for facile installation, said end portions of said first piece being of circular external cross-sectional configuration, one of said end portions of each of said second piece, said third piece, and said fourth piece constituting a collar portion having an inwardly extending recess of circular cross-sectional configuration, and the opposite end portion of said second piece being of circular external cross-sectional configuration, said recesses in said collar portions of said second and third pieces being dimensioned to telescopically and rotatably seat one of said end portions of said first piece therewithin, and said recess in said collar portion of said fourth piece being dimensioned to telescopically and rotatably seat said opposite end portion of said second piece therewithin, said collar portions overlapping the end portions of the pieces seated therewithin.

14. The system of claim 13 wherein the opposite end of said fourth piece also defines an inwardly extending recess, said recesses in said collar portion and said opposite end of said fourth piece opening in opposite directions.

* * * * *

UNITED STATES PATENT AND TRADEMARK OFFICE
CERTIFICATE OF CORRECTION

| | | |
|---|---|---|
| PATENT NO. | : 5,259,410 | Page 1 of 1 |
| APPLICATION NO. | : 07/944836 | |
| DATED | : November 9, 1993 | |
| INVENTOR(S) | : Steven R. Trueb et al. | |

It is certified that error appears in the above-identified patent and that said Letters Patent is hereby corrected as shown below:

On the cover page, line "[*]," delete from the Notice the date "Oct. 8, 2008" and substitute therefor -- expiration of Pat. No. 5,054,513 --.

Signed and Sealed this

Nineteenth Day of February, 2008

JON W. DUDAS
*Director of the United States Patent and Trademark Office*